United States Patent
Ho et al.

(10) Patent No.: US 7,412,582 B2
(45) Date of Patent: Aug. 12, 2008

(54) METHOD AND DEVICE FOR BURST READING/WRITING MEMORY DATA

(75) Inventors: Kuan-Jui Ho, Shindian (TW); Hsiu Ming Chu, Shindian (TW)

(73) Assignee: VIA Technologies, Inc., Taipei (TW)

(*) Notice: Subject to any disclaimer, the term of this patent is extended or adjusted under 35 U.S.C. 154(b) by 299 days.

(21) Appl. No.: 11/127,113

(22) Filed: May 12, 2005

(65) Prior Publication Data

US 2006/0212615 A1    Sep. 21, 2006

(30) Foreign Application Priority Data

Mar. 15, 2005    (TW) .............................. 94107938 A

(51) Int. Cl.
*G06F 12/04* (2006.01)
(52) U.S. Cl. ...................................................... 711/167
(58) Field of Classification Search ................... 711/167
See application file for complete search history.

(56) References Cited

U.S. PATENT DOCUMENTS

| 5,522,050 | A | * | 5/1996 | Amini et al. ................. 710/315 |
| 5,732,241 | A | * | 3/1998 | Chan ........................... 711/131 |
| 7,075,822 | B2 | * | 7/2006 | Elmhurst et al. ........ 365/185.03 |
| 2005/0089106 | A1 | * | 4/2005 | Cho et al. .................... 375/257 |

* cited by examiner

*Primary Examiner*—Hyung Sough
*Assistant Examiner*—Hamdy S Ahmed
(74) *Attorney, Agent, or Firm*—Birch, Stewart, Kolasch & Birch, LLP

(57) ABSTRACT

A device for burst reading/writing memory data includes a memory module and a north bridge chipset. The device is used for executing a power on self test (POST). The memory module has a plurality of memory cells and the north bridge chipset includes a programmable register module and a memory module controller, wherein the programmable register module stores at least one set of default information. The memory module controller performing burst read/write on the memory cells according to the default information stored in the programmable register module.

12 Claims, 3 Drawing Sheets

METHOD AND DEVICE FOR BURST READING/WRITING MEMORY DATA

BACKGROUND OF THE INVENTION

1. Field of Invention

The invention relates to a method and device for burst reading/writing memory data and, in particular, to a method and device for burst reading/writing memory data without the control of the central processing unit (CPU).

2. Related Art

With the rapid development of computer technology, the CPU has evolved from the 8086 16-bit processor to the current 64-bit processor. Its processing speed has a tremendous progress. The existence of double-CPU systems also enhances the processing speed and efficiency a lot.

Although the processing speed of the CPU is noticeably enhanced, the speed of the dynamic random access memory (DRAM) commonly used in computers is far behind the CPU speed. Moreover, the DRAM has to be refreshed before using it. This further lowers the processing speed. To prevent the memory from the bottleneck of CPU data processing, the current CPU's are all equipped with cache memory to temporarily hold required data. The data access speed is enhanced by using the write through or write back technology.

However, the faster the processing speed is, the more likely errors will occur during data access. When a RAM access error occurs, the running program will freeze or even requires the user to restart the system. This will cause a serious loss if the user is editing some important data without saving. It is particularly a serious problem for a large server. Therefore, an error checking and correcting (ECC) function is being developed to avoid such situations.

In a system with the ECC function, the memory has to be refreshed once when the system is started. Suppose in a 64-bit system [64 bits=8 bytes=1 QW(quad word)]. The burst length is 8, and the cache length is 8 QW. The CPU refreshes 4 bytes at a time. With the cache off condition, the CPU has to perform one reading and one writing to refresh each 4 bytes if there are 8 QW (64 bytes) of data. This is because memory with the ECC function has to execute the read-modify-write (RMW) process. The 8 QW data are first read to the north bridge chipset, and then the data written by the CPU are modified. Finally, the 8 QW data are written back to the DRAM. Totally, it involves 16 times of reading and 16 times of writing. Using the write through technology, the 8 QW data are read to the cache before performing 16 times of reading and 16 times of writing. Therefore, it totally needs 17 times of reading and 16 times of writing. With the cache on condition and using the write back technology, the 8 QW data are first read to the cache. The CPU prepares the data to be written and then writes back to the memory. Therefore, it requires one time of reading and one time of writing.

If one applies the above-mentioned methods to a system with more than 1 GB of memory, then the system will waste a lot of time during power on. Therefore, how to burst reading/writing memory data to reduce the system power on time is an important subject in the field.

SUMMARY OF THE INVENTION

In view of the foregoing, the invention is to provide a method and a device for burst reading/writing memory data.

To achieve the above, a device for burst reading/writing memory data of the invention includes a memory module and a north bridge chipset and is used for a power on self test (POST) of the computer. The memory module has a plurality of memory cells. The north bridge chipset includes a programmable register module and a memory module controller. The programmable register module stores at least one set of default information. The memory module controller is directed to the memory cells to perform the burst read or the burst write in accordance with the default information that is stored in the programmable register module.

Moreover, the invention also discloses a method for burst reading/writing memory data, which is implemented in a computer system with a north bridge chipset and a memory module. The north bridge chipset comprises at least a memory module controller for storing at least one set of default information and a programmable register module for containing a plurality of memory cells. The method for burst reading/writing memory data includes the following steps. First, a basic input/output system (BIOS) module transmits an initial signal to a north bridge chipset. Second, the north bridge chipset transmits a start signal to a memory module controller. Finally, the memory module controller performs burst read or burst write on memory cells according to at least one set of default information stored in a programmable register module.

As mentioned above, the method and device for burst reading/writing memory data add a programmable register module to the north bridge chipset and transmit the signals to the north bridge chipset by the BIOS module, so that the memory module controller in the north bridge chipset performs reading or writing on the memory module according to the default information stored in the programmable register module, without the control of the CPU.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
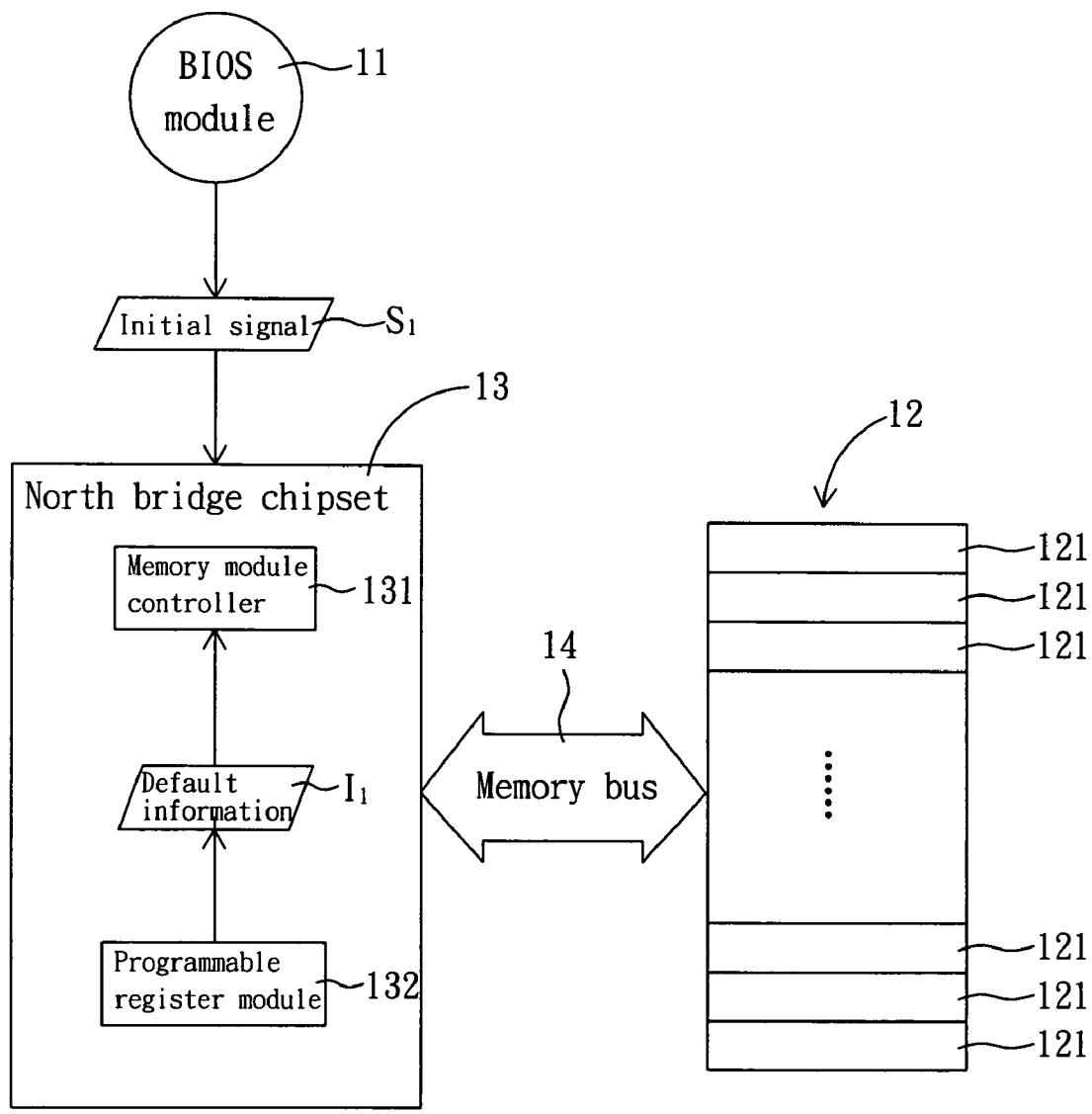
FIG. 1 is a schematic view showing a device for burst reading/writing memory data according to a preferred embodiment of the invention.

As shown in FIG. 1, a device for burst reading/writing memory data according to a preferred embodiment of the invention includes a BIOS module 11, a memory module 12, and a north bridge chipset 13. The device for burst reading/writing memory data is used for a POST of a computer.

The BIOS module 11 generates an initial signal $S_1$ to the north bridge chipset 13.

The memory module 12 has a plurality of memory cells 121. In this embodiment, the memory module 12 is a DRAM module.

The north bridge chipset 13 includes a memory module controller 131 and a programmable register module 132. In this embodiment, the programmable register module 132 stores at least one set of default information $I_1$. The memory module controller 131 performs the burst read or the burst write on the memory cells 121 via a memory bus 14 in accordance with the default information $I_1$ that is stored in the programmable register module.

Figure 2:
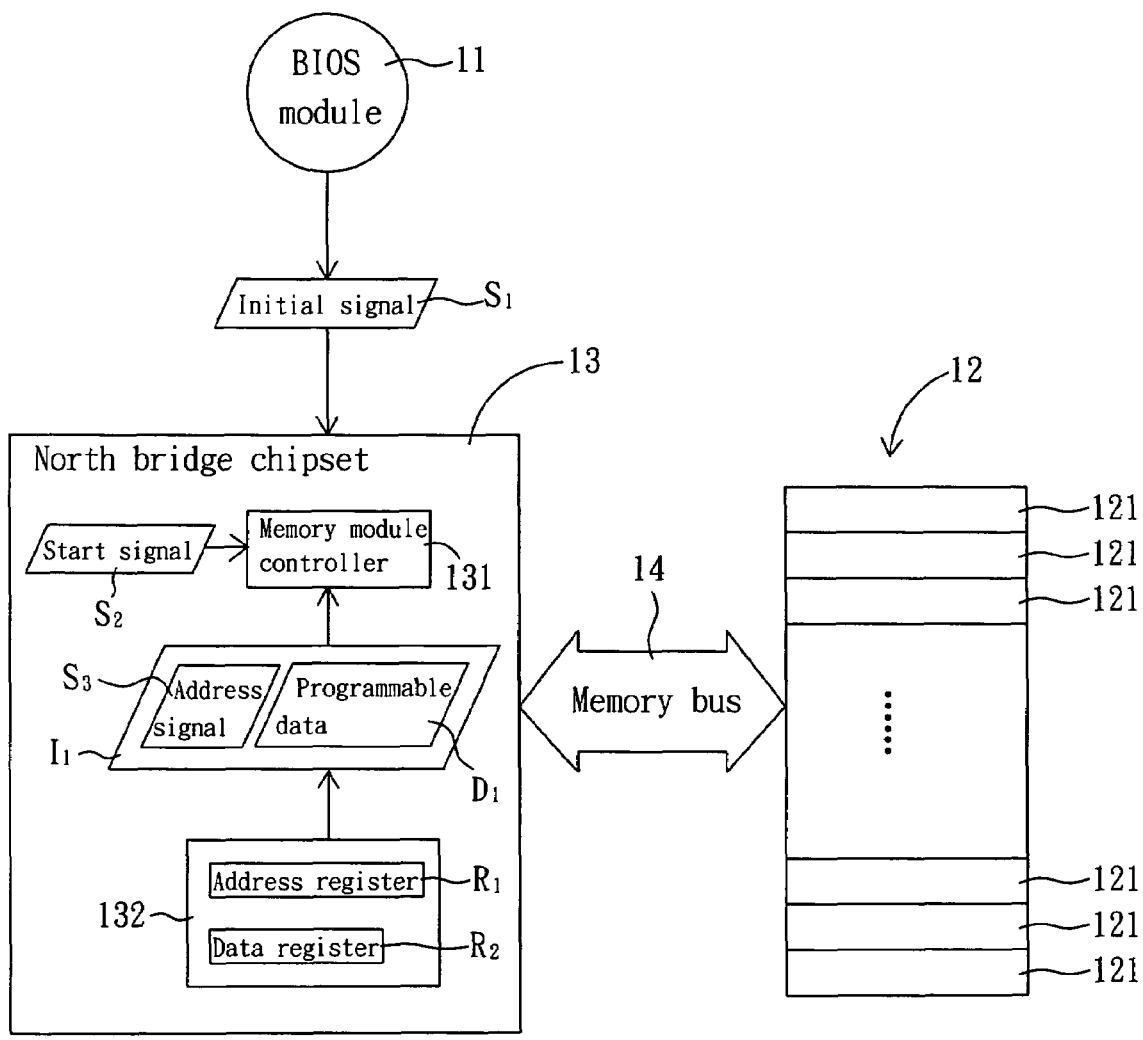
FIG. 2 is another schematic view showing the device for burst reading/writing memory data according to the preferred embodiment of the invention.

As shown in FIG. 2, the programmable register module 132 of this embodiment may further include an address register $R_1$ and a data register $R_2$. The address register $R_1$ stores at least one address datum. The programmable register module 132 converts the address datum into an address signal $S_3$ that is sent to the memory module controller 131. In this embodiment, the address data further include an initial address and an ending address. The programmable register module 132 converts the initial address and the ending address into an initial address signal and an ending address signal. In this embodiment, the address data represent the addresses of the memory cells 121 of the memory module 12. The data register $R_2$ stores at least a programmable datum $D_1$, whose content is the data to be written to the memory cells 121 of the memory module 12.

Figure 3:
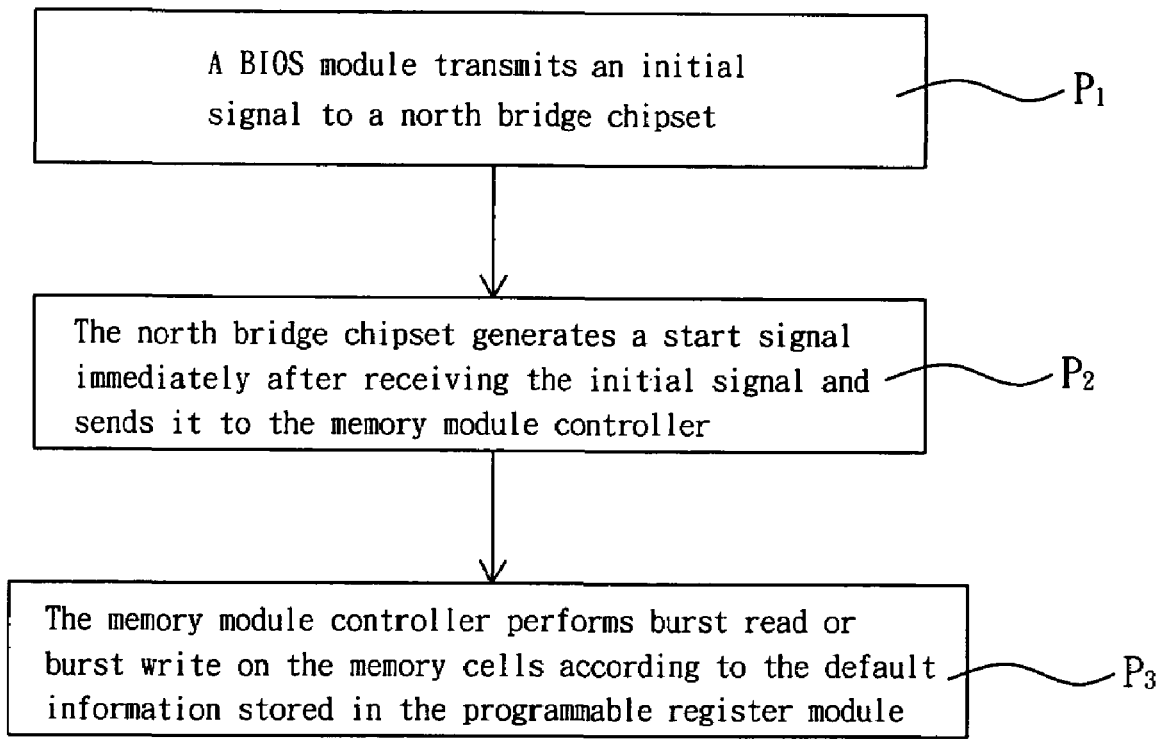
FIG. 3 is a flowchart of the method for burst reading/writing memory data according to a preferred embodiment of the invention.

As illustrated in FIG. 3 in view of FIG. 2, a method for burst reading/writing memory data according to a preferred embodiment of the invention is implemented in a computer system with a north bridge chipset 13 and a memory module 12. The north bridge chipset 13 contains at least a memory module controller 131 and a programmable register module 132. The programmable register module 132 stores at least one set of default information $I_1$. Moreover, the memory module 12 has a plurality of memory cells 121. In this embodiment, the memory module 12 is a DRAM module. The procedures of the disclosed method for burst reading/writing memory data are as follows.

First, a procedure $P_1$ is that a BIOS module 11 transmits an initial signal $S_1$ to a north bridge chipset. In this embodiment, the initial signal $S_1$ is generated in the step of a POST of the computer.

Afterwards, a procedure $P_2$ is that the north bridge chipset 13 generates a start signal $S_2$ immediately after receiving the initial signal $S_1$ and sends it to the memory module controller 131.

Finally, a procedure $P_3$ is that the memory module controller 131 performs burst read or burst write on the memory cells 121 according to the default information $I_1$ stored in the programmable register module 132. In this embodiment, when the memory module controller 131 performs the burst read or burst write, it is not controlled by the CPU. That is, the CPU does not need to wait until the memory module controller 131 finishes reading or writing before performing other procedures.

To make the invention more comprehensive, an example is described hereinafter for illustrating the method and device for burst reading/writing memory data of the invention.

Take the ECC executed during the POST step of the computer as an example. The memory module with the ECC function has to refresh its contents before it can be used. Suppose there is a 1 GB memory module and its contents are to be refreshed.

In this case, the BIOS module 11 generates an initial signal $S_1$ and sends it to the north bridge chipset 13. The north bridge chipset 13 generates a start signal $S_2$ and transmits it to the memory module controller 131. The memory module controller 131 extracts the default information $I_1$ from the programmable register module 132. The default information $I_1$ can be stored in advance or set by the user when the initial signal $S_1$ is generated. In this embodiment, the initial address in the address register $R_1$ is set as 0 and the ending address is 1 G. In the data register $R_2$, the programmable data $D_1$ is first set as 0 (i.e., the addresses from 0 to 1 G in the memory module are refreshed as 0). Finally, the memory module controller 131 executes the burst write on the memory module 12 via a memory bus 14 according to the default information $I_1$, writing 0 to the memory module at one time without the involvement of the CPU.

The above-mentioned method can also be used in testing the memory bus signal integration. For example, the data quick signal input (DQSI) or data quick signal output (DQSO) are executed during the POST step of the computer.

In summary, the disclosed method and device for burst reading/writing memory data add a programmable register module to the north bridge chipset, so that the memory module controller in the north bridge chipset performs reading or writing on the memory module according to the default information stored in the programmable register module, without the control of the CPU. One-time reading or writing can be directly performed in the requested memory address range. This saves a lot of time in reading and writing at the same time as in the prior art.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A device for burst reading/writing memory data, which is used for a power on self test (POST) of a computer, comprising:
   a memory module, which has a plurality of memory cells;
   a north bridge chipset, including:
      a programmable register module, including:
         an address register storing a default initial address and a default ending address corresponding to an address range of the memory cells; and
         a data register storing a default programmable data, wherein the programmable register module converts the default initial address and the default ending address into an initial address signal and an ending address signal; and
      a memory module controller for performing burst read/write on the address range of the memory cells according to the initial address signal, the ending address signal and the default programmable data stored in the programmable register module, and the execution of burst read/write is not controlled by the CPU.

2. The device of claim 1, wherein the memory module is a dynamic random access memory (DRAM) module.

3. The device of claim 1, further comprising:
   a basic input/output system (BIOS) module, which generates an initial signal to the north bridge chipset to start the memory module controller to perform burst read/write on the address range of the memory cells according to the initial address signal, the ending address signal and the default programmable data.

4. The device of claim 3, wherein the initial signal is generated during the POST step of the computer.

5. The device of claim 4, wherein the POST step also involves the execution of an error checking and correction (ECC).

6. The device of claim 4, wherein the POST step further involves the execution of a data quick signal output (DQSO).

7. The device of claim 4, wherein the POST step further involves the execution of a data quick signal input (DQSI).

8. A method for burst reading/writing memory data implemented in a computer system with a north bridge chipset and a memory module, the north bridge chipset comprising at least a memory module controller and a programmable register module, the programmable register module comprising an address register and a data register, wherein the memory module has a plurality of memory cells, the address register stores a default initial address and a default ending address corresponding to an address range of the memory cells, and the data register stores a default programmable data, the method comprising the steps of:

transmitting an initial signal to the north bridge chipset by a BIOS module;

converting the default initial address and the default ending address into an initial address signal and an ending address signal by the programmable register module;

transmitting a start signal to the memory module controller by the north bridge chipset; and performing burst read/write on the address range of the memory cells according to the initial address signal, the ending address signal and the default programmable data stored in the programmable register module by the memory module controller and the execution of burst read/write is not controlled by the CPU.

9. The method of claim 8, wherein the initial signal is generated during a POST step of the computer system.

10. The method of claim 9, wherein the POST step also involves the execution of an error checking and correction (ECC).

11. The method of claim 9, wherein the POST step further involves the execution of a data quick signal output (DQSO).

12. The method of claim 9, wherein the POST step further involves the execution of a data quick signal input (DQSI).

* * * * *